(12) United States Patent
Alvarez et al.

(10) Patent No.: US 8,204,829 B2
(45) Date of Patent: Jun. 19, 2012

(54) SYSTEMS AND METHODS FOR MONEY SHARING

(75) Inventors: David R. Alvarez, San Bruno, CA (US); Mitchell A. Shapiro, San Bruno, CA (US)

(73) Assignee: Nexxo Financial Corporation, Burlingame, CA (US)

( * ) Notice: Subject to any disclaimer, the term of this patent is extended or adjusted under 35 U.S.C. 154(b) by 1308 days.

(21) Appl. No.: 10/966,958

(22) Filed: Oct. 15, 2004

(65) Prior Publication Data

US 2005/0086168 A1 Apr. 21, 2005

Related U.S. Application Data

(60) Provisional application No. 60/512,290, filed on Oct. 17, 2003.

(51) Int. Cl.
*G06Q 40/00* (2006.01)
(52) U.S. Cl. ............................. 705/41; 705/39
(58) Field of Classification Search .................. 705/39, 705/35, 43
See application file for complete search history.

(56) References Cited

U.S. PATENT DOCUMENTS

| | | | |
|---|---|---|---|
| 5,326,960 A * | 7/1994 | Tannenbaum | 235/379 |
| 5,350,906 A | 9/1994 | Brody et al. | |
| 5,440,108 A | 8/1995 | Tran et al. | |
| 5,649,118 A | 7/1997 | Carlisle et al. | |
| 5,686,713 A | 11/1997 | Rivera | |
| 5,864,830 A | 1/1999 | Armetta et al. | |
| 5,897,625 A | 4/1999 | Gustin et al. | |
| 5,937,396 A | 8/1999 | Konya | |
| 5,940,811 A | 8/1999 | Norris | |
| 5,949,046 A | 9/1999 | Kenneth et al. | |
| 5,953,710 A * | 9/1999 | Fleming | 705/38 |
| 5,963,647 A | 10/1999 | Downing et al. | |
| 6,012,048 A | 1/2000 | Gustin et al. | |
| 6,044,360 A | 3/2000 | Picciallo | |
| 6,105,009 A | 8/2000 | Cuervo | |

(Continued)

FOREIGN PATENT DOCUMENTS

FR 002790128 A1 8/2000

(Continued)

OTHER PUBLICATIONS

U.S. Appl. No. 10/966,925, David R. Alvarez, Systems and Methods for Generating Revenue from Multi-Card Money Sharing, filed Oct. 15, 2004.

(Continued)

*Primary Examiner* — Ojo O Oyebisi
(74) *Attorney, Agent, or Firm* — Carr & Ferrell LLP (57) ABSTRACT

A system and a method for money sharing are provided. The system includes a processor configured to receive a deposit amount and assign an account value to a stored-value account. The stored-value account is stored in a storage device. The processor then dispenses two or more stored-value cards associated with the stored-value account. The stored-value cards can be distributed among two or more cardholders who may withdraw money from the stored-value account at a remote access unit configured to accept any of the distributed stored-value cards associated with the same account. Additional deposit amounts can be received into the stored-value account from a cardholder of any distributed stored-value cards associated with the same account. The remote access unit can be unattended. The cards can be ATM-enabled.

9 Claims, 9 Drawing Sheets

U.S. PATENT DOCUMENTS

| | | | |
|---|---|---|---|
| 6,129,275 | A | 10/2000 | Urquhart et al. |
| 6,141,438 | A | 10/2000 | Blanchester |
| 6,298,336 | B1 | 10/2001 | Davis et al. |
| 6,327,573 | B1 | 12/2001 | Walker et al. |
| 6,467,684 | B2 | 10/2002 | Fite et al. |
| 6,473,500 | B1 | 10/2002 | Risafi et al. |
| 6,502,747 | B1 | 1/2003 | Stoutenburg et al. |
| 6,573,983 | B1 | 6/2003 | Laskowski |
| 6,575,362 | B1 | 6/2003 | Bator et al. |
| 6,578,761 | B1 | 6/2003 | Spector |
| 6,598,794 | B1 | 7/2003 | Ishii |
| 6,609,113 | B1 | 8/2003 | O'Leary et al. |
| 6,619,545 | B2 | 9/2003 | Harris |
| 6,636,833 | B1 | 10/2003 | Flitcroft et al. |
| 6,659,259 | B2 | 12/2003 | Knox et al. |
| 6,758,394 | B2 | 7/2004 | Maskatiya et al. |
| 6,918,537 | B2 | 7/2005 | Graves et al. |
| 6,999,569 | B2 | 2/2006 | Risafi et al. |
| 7,257,246 | B1 | 8/2007 | Brodie et al. |
| 7,735,125 | B1 | 6/2010 | Alvarez et al. |
| 2001/0001856 | A1 | 5/2001 | Gould et al. |
| 2001/0011680 | A1 | 8/2001 | Soltesz et al. |
| 2001/0013018 | A1 | 8/2001 | Awano |
| 2001/0032878 | A1 | 10/2001 | Tsiounis et al. |
| 2001/0042784 | A1 | 11/2001 | Fite et al. |
| 2001/0054019 | A1 | 12/2001 | de Fabrega |
| 2002/0022966 | A1 | 2/2002 | Horgan |
| 2002/0029195 | A1 | 3/2002 | Russell et al. |
| 2002/0049669 | A1 | 4/2002 | Bleser et al. |
| 2002/0061094 | A1 | 5/2002 | Walker et al. |
| 2002/0082993 | A1 | 6/2002 | Hoyos et al. |
| 2002/0091937 | A1 | 7/2002 | Ortiz |
| 2002/0179401 | A1 | 12/2002 | Knox et al. |
| 2002/0198806 | A1 | 12/2002 | Blagg et al. |
| 2003/0024979 | A1 | 2/2003 | Hansen et al. |
| 2003/0046249 | A1 | 3/2003 | Wu |
| 2003/0074310 | A1 | 4/2003 | Grovit et al. |
| 2003/0080185 | A1 | 5/2003 | Werther |
| 2003/0088470 | A1 | 5/2003 | Cuervo |
| 2003/0097331 | A1 * | 5/2003 | Cohen .................... 705/39 |
| 2003/0105714 | A1 | 6/2003 | Alarcon-Luther et al. |
| 2003/0130940 | A1 | 7/2003 | Hansen et al. |
| 2003/0144971 | A1 | 7/2003 | Das et al. |
| 2003/0200180 | A1 | 10/2003 | Phelan, III et al. |
| 2003/0218062 | A1 | 11/2003 | Noriega et al. |
| 2004/0007618 | A1 | 1/2004 | Oram et al. |
| 2004/0059953 | A1 | 3/2004 | Purnell |
| 2004/0091136 | A1 | 5/2004 | Dombrowski |
| 2004/0223629 | A1 | 11/2004 | Chang |
| 2005/0021363 | A1 | 1/2005 | Stimson et al. |
| 2005/0038737 | A1 | 2/2005 | Norris |
| 2005/0082364 | A1 | 4/2005 | Alvarez et al. |
| 2005/0091161 | A1 | 4/2005 | Gustin et al. |
| 2005/0127169 | A1 | 6/2005 | Foss, Jr. |
| 2005/0269415 | A1 | 12/2005 | Licciardello et al. |
| 2006/0032911 | A1 | 2/2006 | Arias |
| 2006/0037835 | A1 | 2/2006 | Doran et al. |
| 2006/0064379 | A1 | 3/2006 | Doran et al. |
| 2006/0069642 | A1 * | 3/2006 | Doran et al. .................... 705/39 |
| 2007/0168283 | A1 | 7/2007 | Alvarez et al. |

FOREIGN PATENT DOCUMENTS

| | | | |
|---|---|---|---|
| WO | WO 96/36936 | | 11/1996 |
| WO | WO 97/10560 | * | 3/1997 |
| WO | WO 97/10562 | | 3/1997 |

OTHER PUBLICATIONS

U.S. Appl. No. 10/966,299, James V. Elliott, Systems and Methods for Biometric Identification and Verification of a User of a Kiosk, filed Oct. 15, 2004.

U.S. Appl. No. 10/966,497, David R. Alvarez, Systems and Methods for Generating Revenue from Banking Transactions Using a Stored-Value Card, filed Oct. 15, 2004.

U.S. Appl. No. 10/966,496, David R. Alvarez, Systems and Methods for Identifying and Verifying a User of a Kiosk Using an External Verification System, filed Oct. 15, 2004.

U.S. Appl. No. 10/966,879, David R. Alvarez, Systems and Methods for Banking Transactions Using a Stored-Value Card, filed Oct. 15, 2004.

U.S. Appl. No. 11/657,425, David R. Alvarez, Self-Service Money Remittance with an Access Card, filed Jan. 23, 2007.

The Value in Stored-Value, Lauri Giesen, BAI Online, Banking Strategies, Jul./Aug. 2003, vol. LXXIX, No. IV.

* cited by examiner

SYSTEMS AND METHODS FOR MONEY SHARING

CROSS-REFERENCE TO RELATED APPLICATIONS

This application claims the benefit of U.S. Provisional Application Ser. No. 60/512,290 titled "Systems and Methods for Money Sharing," filed Oct. 17, 2003, which is hereby incorporated by reference.

BACKGROUND

1. Field of the Invention

The present invention relates generally to financial services, and particularly to systems and methods for money sharing.

2. Description of the Prior Art

Sharing of money among relatives, friends, or business partners has always existed in human society. The methods used for money sharing are affected by both the versatility of the forms of money, the mobility of people, and the manifestations of the need to share. Financial transactions have become increasingly credit-based. These changes have spawned a vast network of credit card companies and banking systems. Unfortunately, global traveling, habitation, and migration of people often put customers in situations where existing credit and banking systems do not offer satisfactory money sharing opportunities in terms of convenience, compatibility and directness.

As the sharing of money evolved beyond direct mailing of currencies, people have started to use financial institutions such as banks, credit unions, or brokerage houses as "middlemen" to transfer money from one location to another and from one individual to another. In one example, wire transfer is used through an independent brokerage house having branch offices at various locations to transfer money from one location to another. One problem with wire transfer is that it requires both transferor and transferee to have easy access to a branch office of the brokerage house.

Bank cards such as debit cards associated with a traditional bank account could also be used to transfer money from a transferor to a transferee. In one example, a transferor having a traditional bank account may receive two debit cards and give one of the debit cards to a transferee. The transferee may then use the debit card to withdraw money from the transferor's bank account. If the transferor does not want the transferee to have access to the main bank account, the transferor may establish a separate debit account with a debit limit particularly for the purpose of transferring money to the transferee. If enabled to access Automatic Teller Machines (ATMs), debit cards shared in this manner could be used to transfer money to a transferee located in many places in the world.

One problem with debit cards, ATM-enabled or not, is that they require a traditional bank account, such as a demand deposit account (DDA). A bank customer must physically go to a branch of a traditional bank to set up a bank account before he can start to use the ATM-enabled debit cards associated with the bank account. The bank typically checks the customer's identity based on their driver's license or other documentation and collects personal information such as address, date of birth, and Social Security number. Banks need to verify identification to prevent fraud and/or improve security for the customer's banking transactions. In addition, most banks require credit checks and US citizenship, without which banks require large deposits. This results in excluding as much as one third of the people desiring the services. Furthermore, there may be government regulations that require proof of identity before using bank accounts to prevent illegal activities such as money laundering and funding of terrorist activities.

Additionally, funds associated with a debit account and debit cards may not be immediately available for withdrawal. For example, a customer having an existing bank account and associated ATM-enabled debit cards may make direct deposits at an ATM without physically visiting a bank branch. The deposits are often made in cash or a check in a deposit envelope. The deposited amount is not immediately available until a bank employee services the ATM machine to collect and process the deposits. This "float period" typically can be 1-3 days long.

Using credit cards could accomplish similar results for money transfer, but with similar problems. A credit card holder usually needs to have good credit history to possess a credit line issued for a credit card. In addition, credit cards can take weeks to issue from a bank. Typically, a customer must submit an application for a credit card. The application is subject to approval. If approved, the credit card is then mailed to the person's address. The process often takes days, if not weeks. In addition to the delays, many people may wish to avoid using credit cards to transfer money due to lack of security, privacy, or credit history.

More importantly, money transfer is different from money sharing among two or more people. Money transfer involves a one-way transfer of money in which money is transferred from a transferor to a transferee. Most money transfer methods are also one-time transfers. The transferee usually receives the transferred money in one withdrawal to complete the one-way transfer. If the transferor needs to transfer more money to the transferee on a subsequent occasion, a separate and unrelated money transfer is performed. Even if an account is set up for multiple money transfer transactions, the account does not provide a way for the transferee to give money back to the transferor.

Stored-value cards typically have been used to provide payment for goods or services after a user has deposited money into a stored-value account. For example, stored-value cards have been used as gift cards and as cards that provide payment for coffee or copies. Stored-value cards have both their origin and history related to merchants who sell goods or services. The stored-value cards are used for direct purchasing of the goods or services by the customers from the merchant.

SUMMARY OF THE INVENTION

The invention addresses the above problems by providing systems and methods for money sharing using multiple stored-value cards associated with a stored-value account. A system for money sharing includes a processor and a storage device. The processor receives a deposit amount and assigns an account value to a stored-value account. The processor dispenses the stored-value cards, which are configured to enable a cardholder to access the stored-value account to withdraw at least a part of the account value from the stored-value account. The multiple cards can also be used to deposit additional amounts into the stored-value account. The storage device stores the stored-value account.

In one embodiment, the stored-value cards are enabled to operate on an Automatic Teller Machine (ATM). In some embodiments, the multiple stored-value cards associated with the same stored-value account are identical. In some embodiments, the processor receives and verifies user identification information including a biometric attribute such as fingerprinting information. In some embodiments, a kiosk is configured to receive a deposit amount, assign an account value to a stored-value account, and dispense stored-value cards. In some embodiments, the kiosk is unattended and creates the Stored-value account without requiring an account holder to preregister.

These systems and methods advantageously provide money sharing without requiring a user to possess a traditional bank account. Most banks require credit checks and US citizenship, without which banks require large deposits. This results in excluding as much as one-third of the people desiring financial services. The systems and methods can be used for global or international money sharing among various parties. In some embodiments, stored-value cards issue instantaneously upon submission of a deposit with sufficient identification and verification of the user. In some embodiments, once monetary value has been deposited in the stored-value account, the funds may be shared instantaneously with one or more other cardholders worldwide.

DETAILED DESCRIPTION OF THE INVENTION

The present invention provides systems and methods for money sharing. Those skilled in the art will recognize that various features disclosed in connection with the embodiments may be used either individually or jointly. It is to be appreciated that while the present invention has been described with reference to preferred implementations, those having ordinary skill in the art will recognize that the present invention may be beneficially utilized in any number of environments and implementations.

The inventions have been described below with reference to specific embodiments. It will be apparent to those skilled in the art that various modifications may be made and other embodiments can be used without departing from the broader scope of the inventions. Therefore, these and other variations upon the specific embodiments are intended to be covered by the present inventions.

The systems and methods for money sharing use multiple stored-value cards associated with a stored-value account. A user does not need a pre-existing bank account to create a stored-value account for money sharing. Money sharing is a financial process for allowing deposits and/or withdrawals of monetary value among multiple users. In an example, an initial user receives multiple stored-value cards and provides them to the parties sharing money, including one for the user, himself. In this example, anyone possessing a stored-value card associated with the stored-value account is able to access a remote access unit such as an ATM machine to withdraw finds from the stored-value account and to deposit additional amounts into the stored-value account, again without being required to have a bank account. The remote access unit can be unattended to further enhance accessibility. Further, the funds may be exchanged for goods, services or currency at a point of sale. When implemented in the form of a network, such as one that is compatible with an ATM network, the systems and methods can be used for instantaneous global or international money sharing among various parties with access to kiosks, ATMs, or POS worldwide.

In the present disclosure, a bank account is an account having funds deposited in a bank that are credited to an account holder and is subject to withdrawal. The terms "funds" and "money" are used interchangeably in the present disclosure.

A debit card is defined as a card, typically plastic, that may be used for purchasing goods and services or for obtaining cash advances for which payment is made from existing funds in a related bank account. A debit card provides about the same float as a checking account (1-3 days). These cards are often part of the comprehensive all-in-one accounts offered by many banks.

A stored-value account is monetary value associated with a card that does not require a credit line or a traditional bank account, such as a demand deposit account ("DDA") or brokerage account. A stored-value card is a card associated with a stored-value account. A stored-value account may be issued by an account issuer based on prepaid or otherwise verified funds. In addition, a stored-value account may be used or "spent" by a user in a transaction between the user and the account issuer, while a traditional bank account (e.g., a checking account) is used by a user in a transaction between the user and a third-party merchant from which the user buys goods or services. The issuing bank for a bank account acts as a credit-giving middleman between the user and the merchant. These characteristics make a stored-value account different from a traditional bank account.

The value of a stored-value card is only realized after funds are deposited into the stored-value account associated with the card. One significant difference exists between a stored-value card and a debit card in that a stored-value card is not required to be associated with a DDA account while a debit card is.

Figure 1:
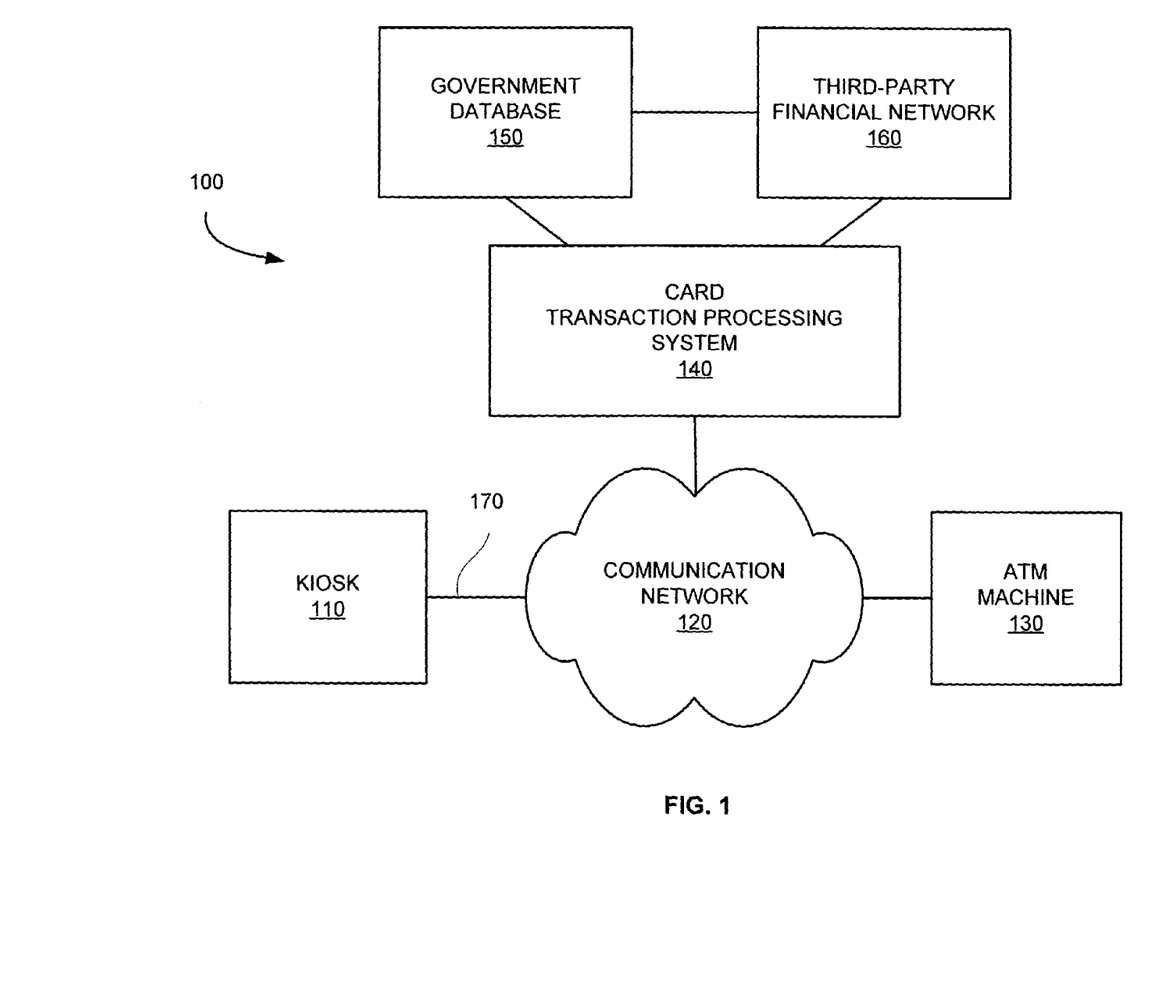
FIG. 1 is a block diagram of a system for money sharing in an exemplary embodiment of the invention.

FIG. 1 is a block diagram of a system 100 for money sharing in an exemplary embodiment of the invention. The system 100 for money sharing includes a kiosk 110, a communication network 120, an ATM machine 130, and card transaction processing system 140, a government database 150, and a third-party financial network 160. The kiosk 110 is coupled to the communication network 120 via the communication link 170. The communication network 120 is coupled to the card transaction processing system 140 and the ATM machine 130. The card transaction processing system 140 is coupled to the government database 150 and the third-party financial network 160. The government database 150 is also coupled to the third-party financial network 160.

As will be shown herein, the government database 150 and the third-party financial network 160, and as well as some other features in FIG. 1, are optional. The operations of the kiosk 110 will be discussed in greater detail below in FIGS. 2-9. The kiosk 110 is any unattended mechanism, device, or system that is designed for public access and provides users access to accounts or financial services. For the sake of simplicity, only one kiosk 110 and only one ATM machine 130 are shown in FIG. 1. It is readily appreciated that that there may be numerous kiosks and ATM machines attached to the communication network 120. The ATM machine 130 can be any type of a remote access unit that is capable of providing the necessary stored-value account access as described in this disclosure. As will be shown below, the kiosk 110 is configured to be able to create new stored-value accounts while the remote access unit (ATM machine 130 in the exemplary embodiment) is configured to provide a stored-value cardholder the necessary access to an existing stored-value account to withdraw money from the account or add more funds to the account. In one embodiment, the kiosk 110 is also configured to provide a stored-value cardholder necessary access to an existing stored-value account to withdraw money from the account or add more funds to the account. In another embodiment, the remote access unit (ATM machine 130 in the exemplary embodiment) and the kiosk 110 are substantially identical in terms of functionality. In other embodiments, the remote access unit (ATM machine 130) is different from the kiosk 110 in at least one function. For example, the remote access unit (ATM machine 130) may not allow users to create new stored-value accounts as the kiosk 110 does.

The communication network 120 is any conventional communication network configured to transfer data or information related to transactions for card processing and financial transactions. In a simple embodiment, the kiosk 110, the ATM machine 130, and the card transaction processing system 140 are connected through the communication network 120 to form a standalone network financial system which does not require participation of a third-party financial system. However, the system 100 allows participation of third-party financial networks 160 such as member bank systems and bank card association network systems. The system 100 so configured is more adapted to become a part of existing global ATM networks. In some embodiments, the communication network 120 includes a supernetwork configured to manage a couple of sub-networks. Some of these sub-networks handle financial communications for managing transactions, deposits, withdrawals, and balance checks. Additionally, some of these sub-networks handle security communications that verify the card, verify personal ID, and check against government databases.

The card transaction processing system 140 is any system configured to process card transactions and store accounts related to cards. In one embodiment, a company called TSYS operates the card transaction processing system 140. In one embodiment, it may be a call center. The government database 150 is any database that contains government information for individual identification for security and/or law enforcement. Some examples of government information are fingerprints, voice samples, photo identification, and personal data. In an embodiment, the government database 150 includes known terrorist or other government mandated lists. In this embodiment, the government database 150 is used to compare against customer identification information before allowing the customer access to accounts and services. Moreover, the government database 150 can be used to notify the government of the time, place, and amount of each cash deposit and withdrawal. In some embodiments, the cash has limited acceptance by time period (e.g. day, week, month, and year) based on information contained in the government database 150. In other embodiments, checking customer identification information against the government database 150 assures compliance with applicable regulations and in real time if necessary. An example of applicable government regulations that may be satisfied through comparing customer identification information against the government database 150 includes Title III of the USA Patriot Act, entitled "International Money Laundering Abatement and Antiterrorist Financing Act of 2001".

Figure 2:
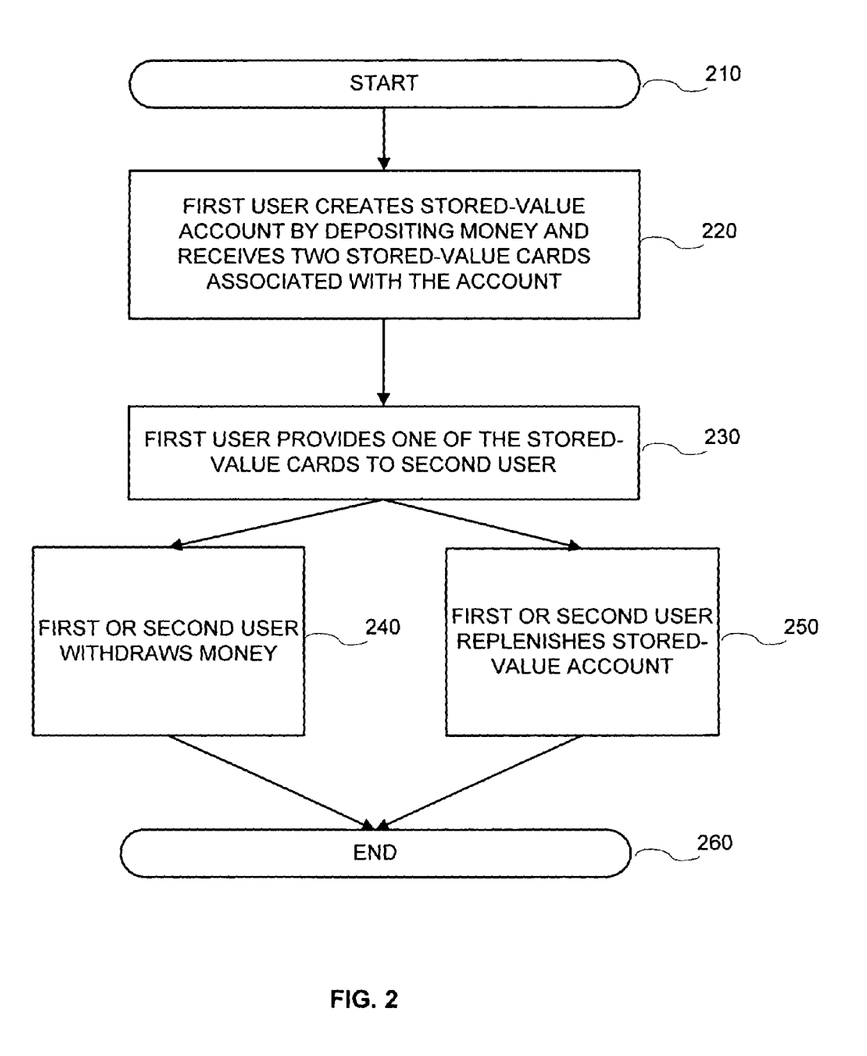
FIG. 2 is a flow chart showing how the system for money sharing is used in an exemplary embodiment of the invention.

FIG. 2 is a flow chart showing how the system for money sharing is used in an exemplary embodiment of the invention. FIG. 2 begins in step 210. In step 220, a first user creates a stored-value account by depositing money and providing personal information (e.g., at kiosk 110 in FIG. 1) and receives two stored-value cards associated with the stored-value account. As will be further illustrated in FIGS. 5-9, creating the stored-value account does not require an existing bank account. For example, once the kiosk 110 receives a cash deposit and user information, the kiosk may immediately allow the creation of a new stored-value account. Subsequently, the funds stored within the stored-value account become immediately available. In another example, a cashier or retailer may receive money and personal information. The cashier or retailer may then give the user one or more stored-value cards.

As will be described herein, money can be deposited in a variety of ways of monetary input. It is noted that even if the monetary input is made using a check or credit card (thus requiring the communication network 120 to be linked to a bank or a credit card company for the purpose of verifying the monetary input), the new account created in FIG. 2 itself may still be a stored-value account instead of a regular bank account, a debit account, or a credit account. Being a stored-value account, the new account created is further not required to be linked to a DDA account, a debit account, or a credit account.

Next, as indicated in step 230, the user provides one of the stored-value cards (a sister card) to a second user, who is an intended party for money sharing, such as a family member or business partner. The user may choose any available method of delivery, including regular airmail, to send the stored-value cards to the second user. As a result, both the first user and the second user are in possession of a stored-value card associated with the same stored-value account. As indicated in step 240, either the first user or the second user may withdraw money using the stored-value card in his possession. In an example, the first or the second user may withdraw money from an access unit. In another example, upon production of the stored-value card, the first or second user may withdraw money from a stored-value account through a retailer. As indicated in independent step 250, either the first user or the second user may deposit more money to replenish the stored-value account. In an example, the first or the second user may deposit more money at an access unit. In another example, upon production of the stored-value card, the first or second user may deposit money into a stored-value account through a retailer. In another example, access units that may be used for these purposes (withdrawal or deposit) include the ATM machine 130 shown in FIG. 1, the kiosk 110, or a different kiosk that is similar to the kiosk 110. Money is thus shared between the first user and the second user. Additional individuals may become a party sharing money if more stored-value cards associated with the same stored-value account are distributed. FIG. 2 ends in step 260.

The present invention therefore permits convenient money sharing between different users at different locations without requiring an existing bank account.

The money sharing system and method shown in FIGS. 1-2 may use a single stored-value account. In other embodiments, the money sharing may involve multiple related stored-value accounts or at least one stored-value account and other types of related accounts.

Figure 3:
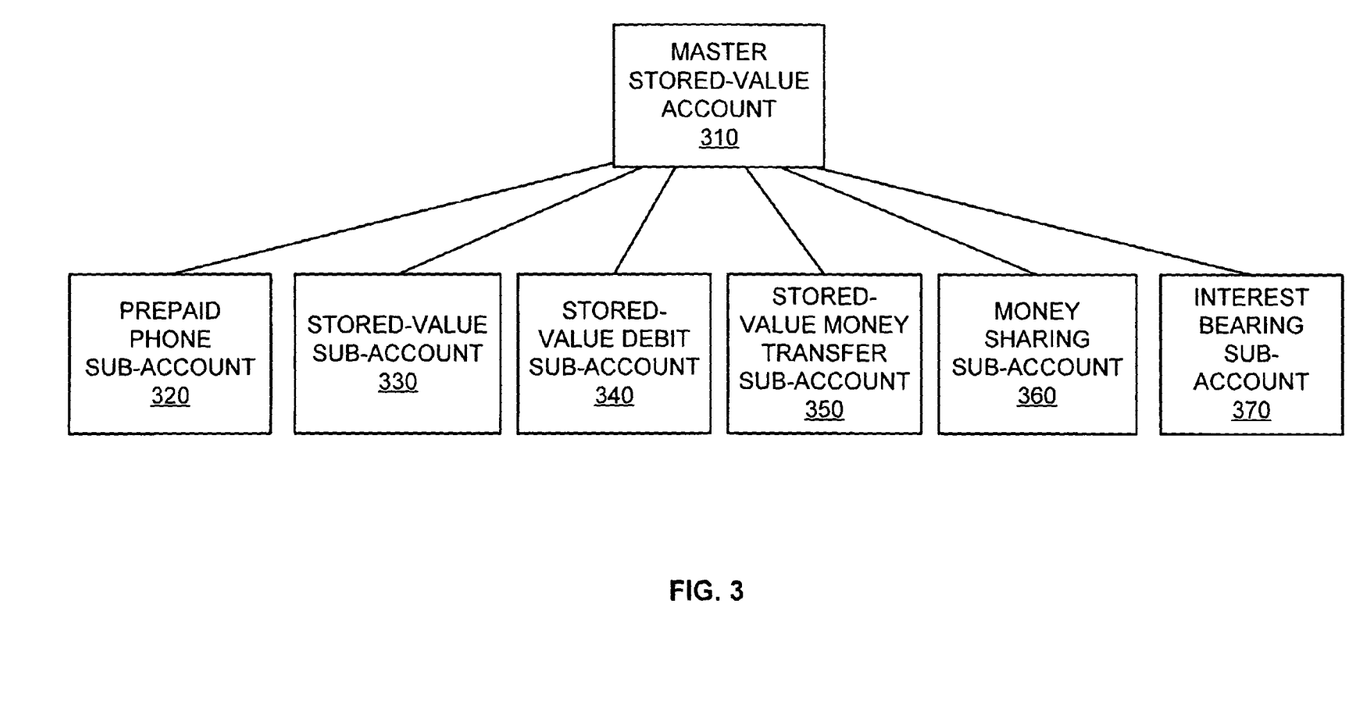
FIG. 3 is a block diagram of a master stored-value account and sub-accounts in an exemplary embodiment of the invention.

FIG. 3 is a block diagram of a master stored-value account and sub-accounts including at least one stored-value sub-account in an exemplary embodiment of the invention. In one embodiment, a master stored-value account 310 is associated with a prepaid phone sub-account 320, a stored-value sub-account 330, a stored-value debit sub-account 340, a stored-value money transfer sub-account 350, a money sharing sub-account 360, and an interest bearing sub-account 370. In other embodiments, the sub-accounts may be for utility bills, school tuition, gift cards, groceries, and other miscellaneous stored-value card programs. In one embodiment, the master stored-value account 310 is a signature- and PIN-based stored-value account.

The master stored-value account 310 can be used to control the sub-accounts 320, 330, 340, 350, 360 and 370, while the money sharing sub-account 360 can be used for money sharing. Specifically, multiple cards may be issued in association with the money sharing sub-account 360 to access the money sharing sub-account 360 through a kiosk (e.g., the kiosk 110) or an ATM machine (e.g., the ATM machine 130) to either withdraw or reload the money sharing sub-account 360. In one embodiment, the multiple cards include a master stored-value card to access both the master stored-value account 310 and the money sharing sub-account 360, and a child stored-value card to access the money sharing sub-account 360 only but not the master stored-value account 310. In another embodiment, the multiple cards include two identical stored-value cards both enabled to access the money sharing sub-account 360 but not the master stored-value account 310. In either embodiment, the cards may be PIN-required ATM-enabled stored-value cards.

In some embodiments, the master stored-value account 310 may be reloaded with funds and used anywhere in the world that a credit/debit card network (such as Visa/Mastercard) is accepted. In some embodiments, the master stored-value account 310 includes phone card capability, the capability to issue money orders or drafts, and the ability to move money into a money-sharing sub-account. The master stored-value account 310 allows movement of some or all of the funds present on the master stored-value account 310 into money sharing sub-accounts which can be either general purpose sub-accounts or restricted use sub-accounts (e.g., for use only at a campus bookstore). These funds can be accessed by taking a cash advance from the master stored-value account 310 at ATMs and banks worldwide, or by using the specially designed money-sharing sister card to affect the cash advance at ATMs globally.

Alternatively, the master stored-value account 310 may be replaced by a bank account or a credit account associated with a bank or a credit card company, while at least one of the sub-accounts, such as the money sharing sub-account 360, is a stored-value account.

Figure 4:
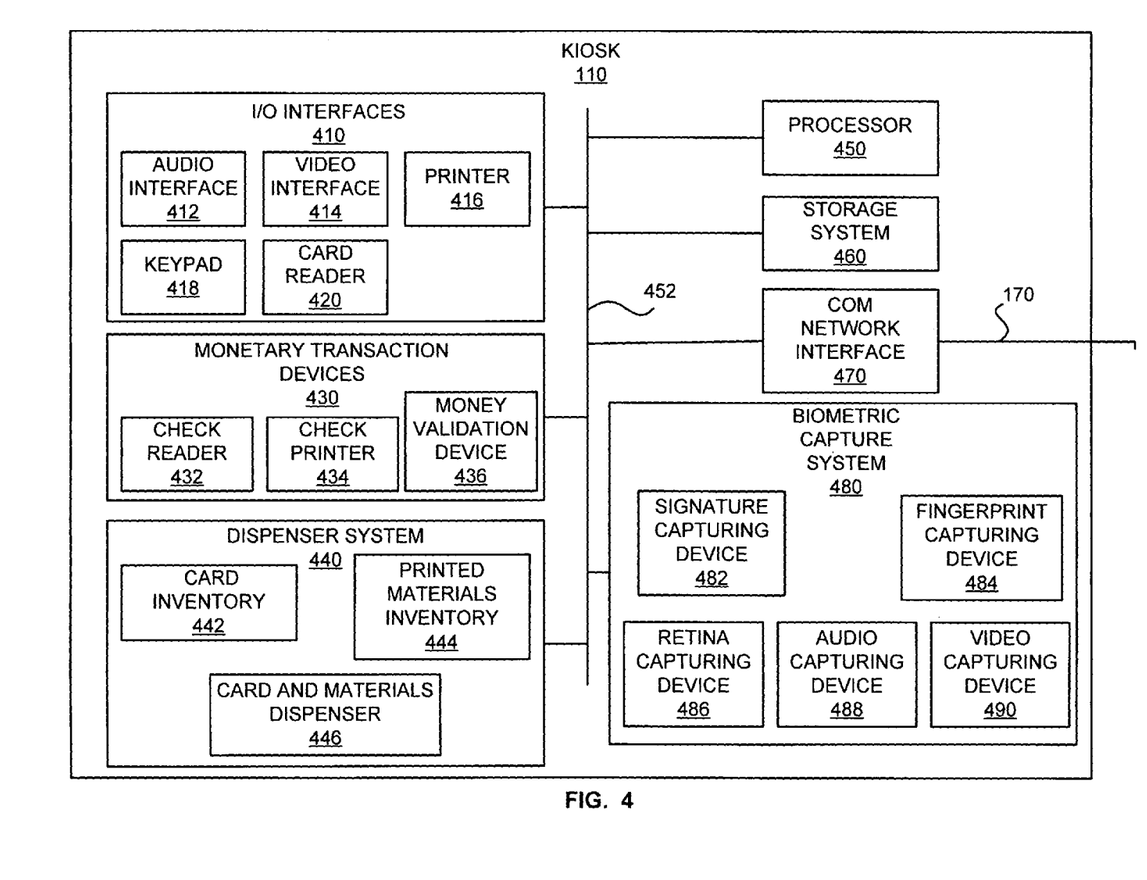
FIG. 4 is a block diagram of a kiosk in an exemplary embodiment of the invention.

FIG. 4 is a block diagram of the kiosk 110 in an exemplary embodiment of the invention. The overall operation of the kiosk 110 will be discussed below in FIGS. 5-9. The kiosk 110 includes input/output (I/O) interfaces 410, monetary transaction devices 430, a dispenser system 440, a processor 450, a bus 452, a storage system 460, a communication network interface 470, a communication link 170, and a biometric capture system 480.

The bus 452 is coupled to the I/O interfaces 410, the monetary transaction devices 430, the dispenser system 440, the processor 450, the storage system 460, the communication network interface 470, and the biometric capture system 480. The communication link 170 is coupled to the communication network interface 470.

The I/O interfaces 410 are any interfaces or devices configured to provide input or output to a user of the kiosk 110. In one embodiment, the I/O interfaces 410 include an audio interface 412, a video interface 414, a printer 416, a keypad 418, and a card reader 420. The audio interface 412 is any device or system configured to audibly communicate between the user and the kiosk 110. Some examples of an audio interface 412 are speakers and a microphone. The video interface 414 is any device or system configured to visually communicate between the user and the kiosk 110. One example of the video interface 414 is a touch-screen display. The printer 416 is a printer configured to print transaction records. The keypad 418 is a standard numeric or alphanumeric keypad. The card reader 420 is a conventional card reader configured to read ATM cards, stored-value cards, debit cards, credit cards, and/or identification cards. In other embodiments, the card reader 420 may be a reader that optically, magnetically, or electrically scans cards.

The monetary transaction devices 430 are any mechanisms, devices, or systems configured to receive or provide monetary instruments such as checks, drafts, money orders, and currency. In one embodiment, the monetary transaction devices 430 include a check reader 432, a check printer 434, and a money validation device 436. The check reader 432 is a reader configured to read and validate checks. The check printer 434 is a printer configured to print financial instruments such as checks, drafts, or money orders. The money validation device 436 is a conventional device configured to accept and validate currency such as bills and coins. In other embodiments, the monetary transaction devices 430 include a money order, check, and draft printer which are not shown in FIG. 3. Other embodiments not shown in FIG. 3, may include a money order, check, and draft reader.

The dispenser system 440 is any device or system configured to dispense cards or printed materials related to financial services. In one embodiment, the dispenser system 440 includes a card inventory 442, a printed materials inventory 444, and a card and materials dispenser 446. The printed materials inventory 444 may include printed materials such as user guides or statement information required by government regulations.

The processor 450 is configured to execute software or instructions in accord with the operations discussed below. The storage system 460 is any storage device, memory, or group of storage devices configured to store data permanently or temporarily. The communication network interface 470 is any communication interface configured to transfer data between any components connected to the bus 452 and any communication network.

The biometric capture system 480 is any mechanism, device, or system configured to capture biometric information from a user of the kiosk 110. Biometric information is any information or data that includes at least one biometric attribute that represents a biological or physical feature of a person. Some examples of biometric information are fingerprints, retina scans, audio images, signatures, and video images.

In one embodiment, the kiosk 110 is unattended. Also, in some embodiments, the user may send an e-mail through the kiosk 110, and the kiosk 110 may display a reply e-mail for customer services purposes.

Figure 5:
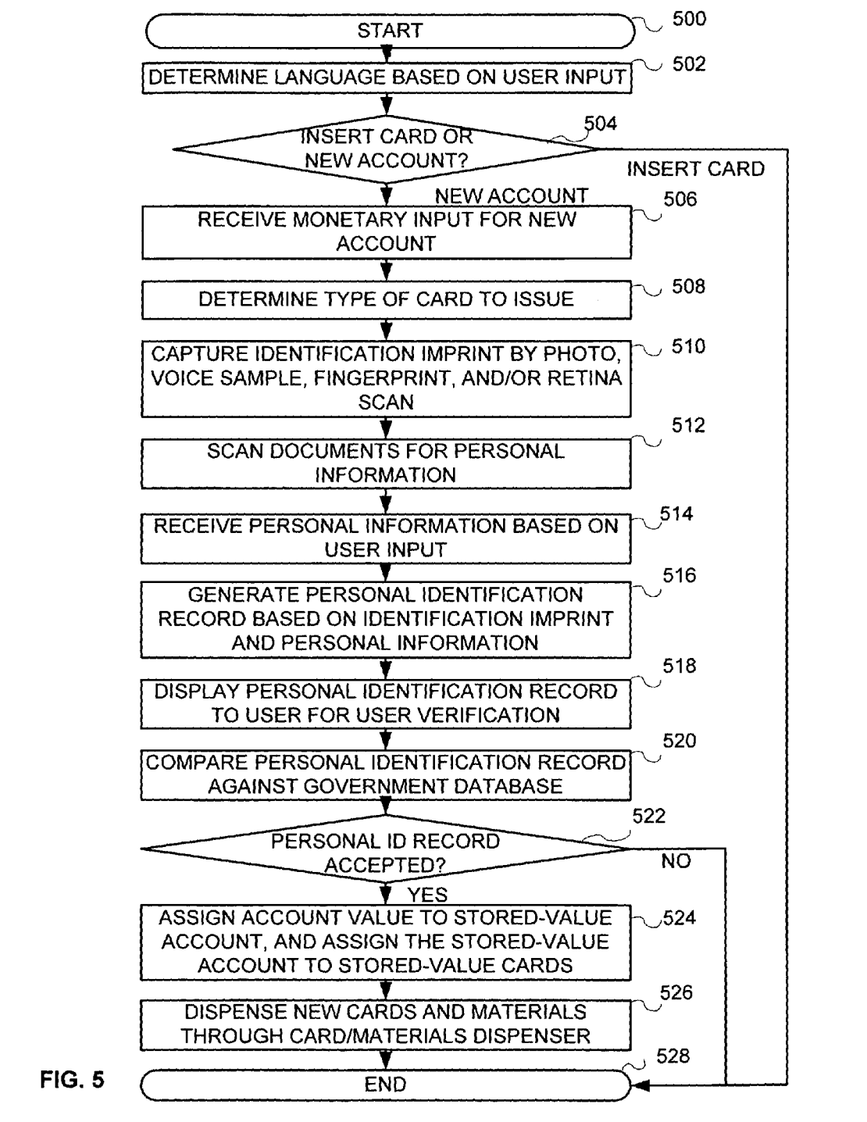
FIG. 5 is a flow chart for creating a new stored-value account and dispensing new stored-value cards in an exemplary embodiment of the invention.

FIG. 5 is a flow chart for creating a new stored-value account and for dispensing new stored-value cards in an exemplary embodiment of the invention. FIG. 5 begins in step 500. In step 502, the kiosk 110 displays an interactive message for the user to determine the preferred language of the user. In step 504, the processor 450 in kiosk 110 checks if a stored-value card was inserted or a new stored-value account was requested by the user. If a stored-value card was inserted, the process for dispensing a new stored-value card ends in step 528. At this point, the kiosk 110 may enter into a different process as shown in, for example, FIG. 6 below.

If a new stored-value account was requested, the kiosk 110 receives a monetary input from the user in step 506. The monetary input constitutes a deposit amount (payment) paid into the new account. Monetary input may include, but is not limited to, cash, check, draft, travelers' check, money order, charge, debit, credit card or stored-value card payments. The kiosk 110 may receive the monetary input through either the check reader 432, the money validation device 436, or any other device in the monetary transaction devices 430 that accepts a deposit amount.

In step 508, the processor 450 determines the type of card to issue. In some embodiments, there may be different types of stored-value cards to issue. In step 510, the biometric capture system 480 captures biometric data by photo, voice sample, fingerprint, and/or retina scan of the user of the kiosk 110. The process of capturing the biometric data of a user of the kiosk 110 is described in further detail in U.S. application Ser. No. 10/966,299 entitled "Systems and Methods for Biometric Identification and Verification of a User of a Kiosk" filed on Oct. 15, 2004, which is hereby incorporated by reference.

In step 512, the kiosk 110 scans documents for personal information. In some embodiments, the kiosk 110 scans the documents for personal information through the card reader 420. Some examples of documents that can be scanned are Matricula Consular cards and driver's licenses. In step 514, the kiosk 110 receives personal information based on user input. The kiosk 110 may receive personal information from the audio interface 412, the video interface 414, the keypad 418, the card reader 420, or the biometric capture system 480. Alternative embodiments may use any one or a combination of steps 510, 512 and 514 to capture identification and personal information.

In step 516, the processor 450 then generates a personal identification record based on the identification imprint and the personal information. In one embodiment, the personal identification record includes name, local address, place and date of birth, digital photo, digital fingerprint, digital voice print, digital photo of ID e.g. driver's license, Social Security number, tax ID number, Matricula Consular card number, and any other data sufficient to meet governmentally mandated standards for customer identification and verification.

In step 518, the kiosk 110 displays the personal identification record using the video interface 414 or the audio interface 412 for user verification. In step 520, the processor 450 compares the personal identification record to the government database 150. In other embodiments, the card transaction processing system 140 or the third-party financial network 160 compares the personal identification record against the government database 150. The comparison process is described in further detail in U.S. application Ser. No. 10/966,496 entitled "Systems and Methods for Identifying and Verifying a User of a Kiosk Using an External Verification System" filed on Oct. 15, 2004, which is hereby incorporated by reference.

In step 522, the processor 450 checks whether the personal identification record is accepted. If the personal identification record is not accepted, the process ends in step 528. If the personal identification record is accepted by the government database, the processor 450 assigns a stored-value account to the stored-value cards in step 524. By doing so, the stored-value cards are associated with the stored-value account and enabled to provide a cardholder subsequent access to the stored-value account. In step 524, an account value indicating the total stored-value amount available in the stored-value account is also assigned to the stored-value account. The account value for the stored-value account is determined based on the value of the funds deposited by the user. In a simple embodiment, the account value is the same as the total value of the funds deposited by the user to create the new stored-value account. In other embodiments, a service fee may be deducted from the total value of the funds deposited and the resultant net value is assigned as the account value to the stored-value account. The process of charging a service fee is described in further detail in U.S. application Ser. No. 10/966,925 entitled "Systems and Methods for Generating Revenue from Multi-Card Money Sharing" filed on Oct. 15, 2004, which is hereby incorporated by reference.

Various methods may be used to associate the stored-value cards with the stored-value account. In one embodiment, the stored-value account has an account number. The stored-value account is associated with the stored-value cards by storing the account number of the stored-value account into memory elements of the stored-value cards. The stored-value cards that have the same stored-value account number stored in their memory elements are thus associated with the same stored-value account. In another embodiment, each stored-value card has its own card identification number which may be created and stored or printed on the card before the card has been placed in the card inventory 442 in the kiosk 110. The card identification numbers are linked to the stored-value account by software. The linking can be performed by a central processing system such as the card transaction processing system 140.

The stored-value account having an account value is thus created without requiring a pre-existing bank account. Furthermore, in some embodiments, the user is not required to preregister in order to be associated with or assigned to a particular stored-value account. Instead, the stored-value account is assigned to the user during the same account creation process shown in FIG. 5.

In step 526, the kiosk 110 dispenses the new stored-value cards, card voucher, and/or printed materials through the dispenser system 440. In one embodiment, the printed materials comprise regulatory statements, marketing material, and an instruction booklet. FIG. 5 ends in step 528.

In one embodiment, the kiosk 110 dispenses two stored-value cards that are associated with the same stored-value account. The two stored-value cards can be interchangeable in terms of functionality. For example, the two stored-value cards may both provide access to the same stored-value account to withdraw money from the stored-value account or deposit additional amounts into the stored-value account. Functionally interchangeable stored-value cards may even be physically identical except for appearances such as colors. However, it is appreciated that functionally interchangeable cards are not required to be physically identical. For example, the two stored-value cards may have different serial numbers but still be functionally interchangeable when both serial numbers are linked to the same stored-value account.

The stored-value cards are preferably ATM-enabled so that they can be operated on ATM machines. ATM-enabled cards typically have a magnetic stripe that contains a memory element in which account information such as account number and user name may be stored. Alternatively or additionally, ATM-enabled cards may have serial numbers pre-printed on the cards. ATM-enabled cards may also be so-called smart cards which have a built-in chip. The chip may be reconfigurable.

At any time after a user has purchased his/her cards, the user may send one or more of those cards to another person, who is located anywhere in the world. The user may also keep one card for himself if the user intends to be a party to share money. Any holder of any of the stored-value cards who also knows the Personal Identification Number (PIN) associated with the cards, may access the funds stored in the stored-value account at any participating remote access unit (e.g., the ATM machine 130).

The stored-value account may be created either prior to or after receiving the deposit amount. The pre-created stored-value account may be further pre-linked to the stored-value cards. In the case where the stored-value account is created after receiving the deposit amount, the account is associated with or linked to the stored-value cards after the account has been created. However, in either case, the stored-value account does not have an assigned account value until the proper funds or payments have been received.

The account information of the stored-value account, including the assigned account value, is stored in a storage device for subsequent access. For better network access to the stored-value account, the stored-value account is desirably stored in a centralized storage (e.g., the card transaction processing system 140) that is separate from the individual kiosk 110 and readily accessible through the communication network 120 from other kiosks or remote access units (e.g., the ATM machine 130). However, the account information may be stored in the storage system 460 in the kiosk 110. Alternatively or additionally, the account information may be stored in the stored-value cards associated with the stored-value account.

In another embodiment, only one stored-value card is dispensed in association with the stored-value account in the process shown in FIG. 5. In this embodiment, another stored-value card associated with the same stored-value account is dispensed either in a previous process or a subsequent process. The two stored-value cards, though dispensed at different times in different processes, together still provide money sharing. For example, the same user may have already received a stored-value card in association with another account (e.g., a master account) and the card is then further associated with the new stored-value account during the process shown in FIG. 5. Such association may be accomplished either by a user choice or automatically based on user identification. Alternatively, the user may elect to have only one stored-value card dispensed at the time when the stored-value account is created in the process shown in FIG. 5 and add a second stored-value card in association with the same stored-value account on a subsequent occasion in order to facilitate multi-card money sharing.

Figure 6:
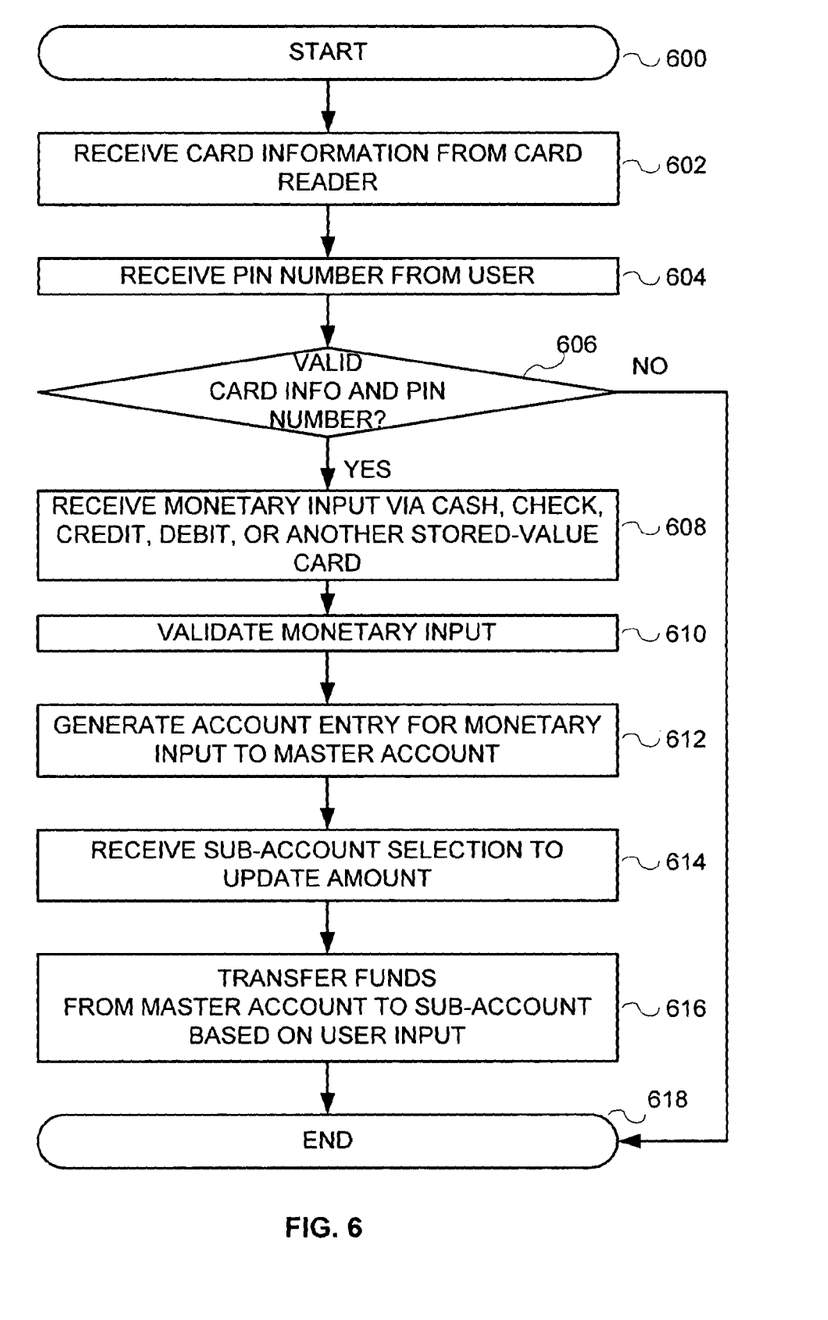
FIG. 6 is a flow chart of a kiosk for sharing value with a sub-account in an exemplary embodiment of the invention.

FIG. 6 is a flow chart of a kiosk for sharing value with a stored-value sub-account in an exemplary embodiment of the invention. FIG. 6 begins in step 600. In step 602, the kiosk 110 receives card information from the card reader 420. In step 604, the kiosk 110 then receives the PIN number from the user through the keypad 418. In step 606, the kiosk 110 checks for valid card information and a valid PIN number. If there is either an invalid card information or invalid PIN number, the process ends in step 618. If there are valid card information and PIN number, the kiosk 110 receives monetary input (deposit amount) via cash, check, draft, credit, debit, or another stored-value card. In step 610, the kiosk 110 validates the monetary input. In step 612, the processor 450 generates an account entry for the monetary input to the master account. In other embodiments, a centralized processor such as the card transaction processing system 140 or the third-party financial network 160, rather than the local processor 450 in the kiosk 110, generates the account entry for the monetary input to the master account. In step 614, the kiosk 110 receives a sub-account selection based on user input to update the amount. In step 616, the kiosk 110 then transfers the funds from the master account to the sub-account based on the user input. In another embodiment, the user may call a call center where the card transaction processing system 140 may transfer funds from the user's master account to different sub-accounts. FIG. 6 ends in step 618.

Figure 7:
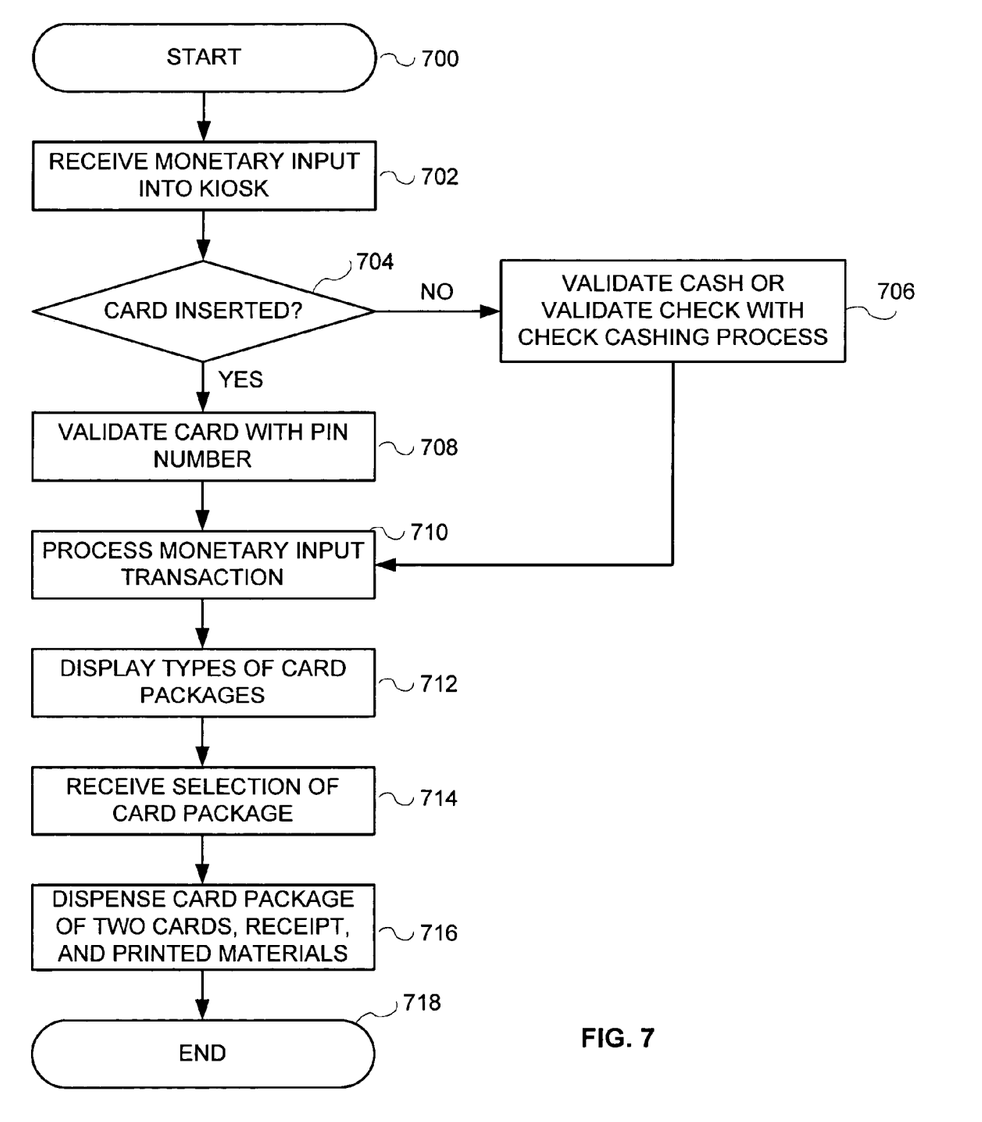
FIG. 7 is a flow chart of the kiosk for dispensing a card package in an exemplary embodiment of the invention.

FIG. 7 is a flow chart of a kiosk for dispensing a card package in an exemplary embodiment of the invention. The process shown in FIG. 7 works for a user with or without an existing stored-value account, and allows the user to select from various card packages which includes an option of a stored-value card package. FIG. 7 begins in step 700. In step 702, the kiosk 110 receives a monetary input by the user. The monetary input constitutes a deposit amount (payment) paid into the stored-value account. Monetary input may include, but is not limited to, cash, check, draft, travelers' check, money order, charge, debit, credit card or stored-value card payments. In step 704, the kiosk 110 checks whether a card was inserted. If not, the kiosk 110 validates the cash or the check with a check cashing process in step 706 before proceeding to step 710. If a card was inserted, the kiosk 110 validates the card with a PIN number in step 708. In step 710, the kiosk 110 processes the monetary input transaction to determine the deposit amount.

In step 712, the kiosk 110 displays types of card packages. In step 714, the kiosk 110 receives a selection for a type of card package. In step 716, the kiosk 110 dispenses a card package with receipt, and printed materials. In one embodiment, the card package includes two stored-value cards. These two cards can further be ATM-enabled stored-value cards. In some embodiments, the cards include a magnetic stripe and/or a chip and PIN. In one embodiment, the printed materials comprise regulatory statements, marketing material, and an instruction booklet. FIG. 7 ends in step 718.

Figure 8:
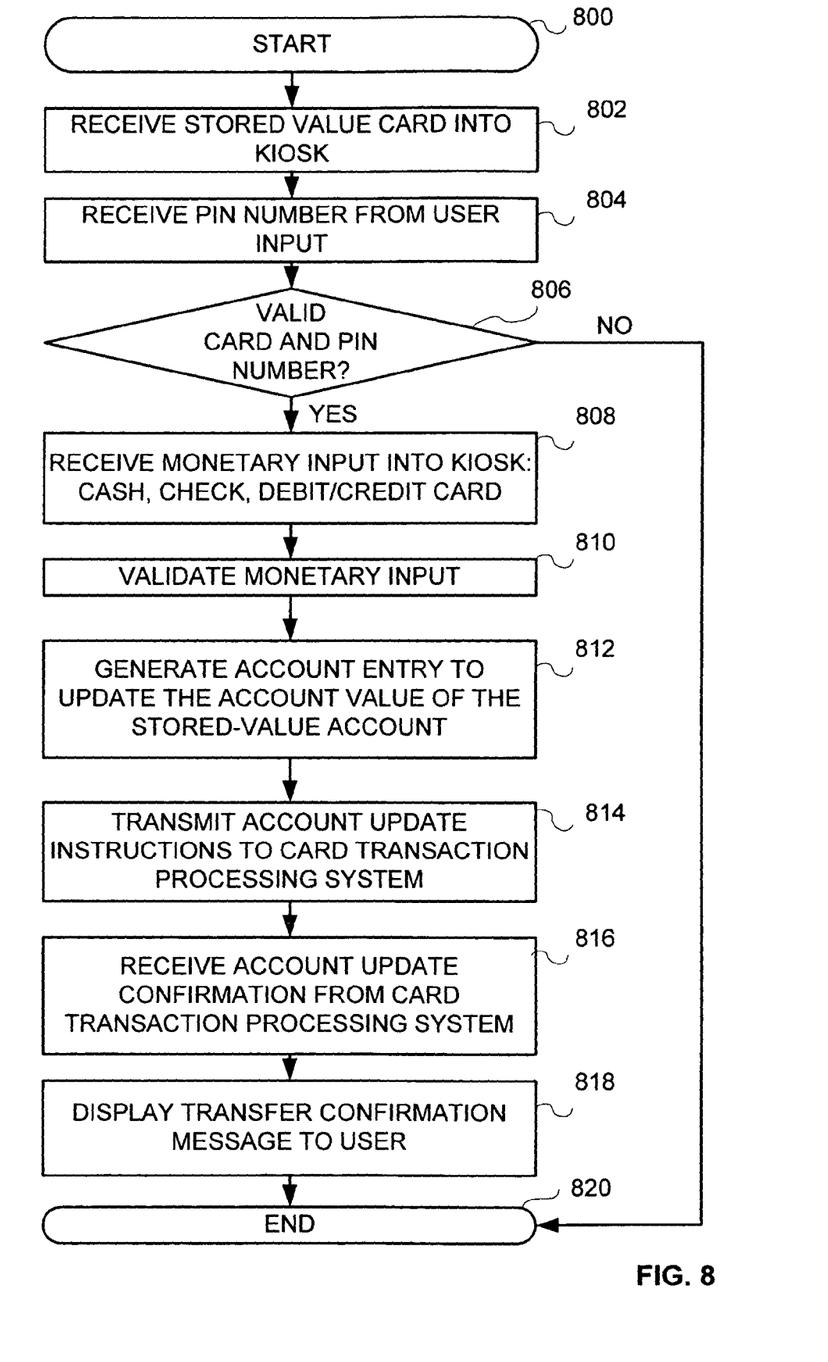
FIG. 8 is a flow chart of the kiosk for charging up an existing stored-value account in an exemplary embodiment of the invention.

FIG. 8 is a flow chart of the kiosk 110 for charging up an existing stored-value account in an exemplary embodiment of the invention. FIG. 8 begins in step 800. In step 802, the kiosk 110 receives a stored-value card. In step 804, the kiosk 110 receives a PIN number from the user via the keypad 418. In step 806, the kiosk 110 checks whether the stored-value card and PIN number are valid. If either the stored-value card or PIN number is invalid, the process ends in step 820. If the stored-value card and PIN are valid, the kiosk 110 receives a monetary input in step 808. Monetary input may include, but is not limited to, cash, check, draft, travelers' check, money order, charge, debit, credit card or stored-value card payments. The monetary input constitutes a deposit amount paid into the stored-value account. In step 810, the kiosk 110 validates the deposit amount.

In step 812, the kiosk 110 generates an account entry to update the account value of the stored-value account. In a simple embodiment, the existing account value of the stored-value account is increased by the deposit amount (total value of the funds received) and validated in steps 808 and 810. In other embodiments, a service fee may be deducted from the deposit amount. In other embodiments, a check clearing waiting period may need to be imposed before the new funds can be accessed. In step 814, the kiosk 110 transmits the account update instructions to the card transaction processing system 140 via the communication network interface 470. The kiosk 110 then receives a transfer confirmation message from the card transaction processing system 140 in step 816. In step 818, the kiosk 110 displays a message indicating the account update is confirmed as well as any applicable fund "hold" periods. FIG. 8 ends in step 820.

Slight modifications may be made in steps 812-818 to add funds to a stored-value sub-account. The funds may be either added directly to the stored-value sub-account or added to a master account first and then transferred to the stored-value sub-account.

In the process shown in FIG. 8, the step 812 may alternatively be performed by a centralized processing system (e.g., the card transaction processing system 140) instead of by a processor in the kiosk 110.

Figure 9:
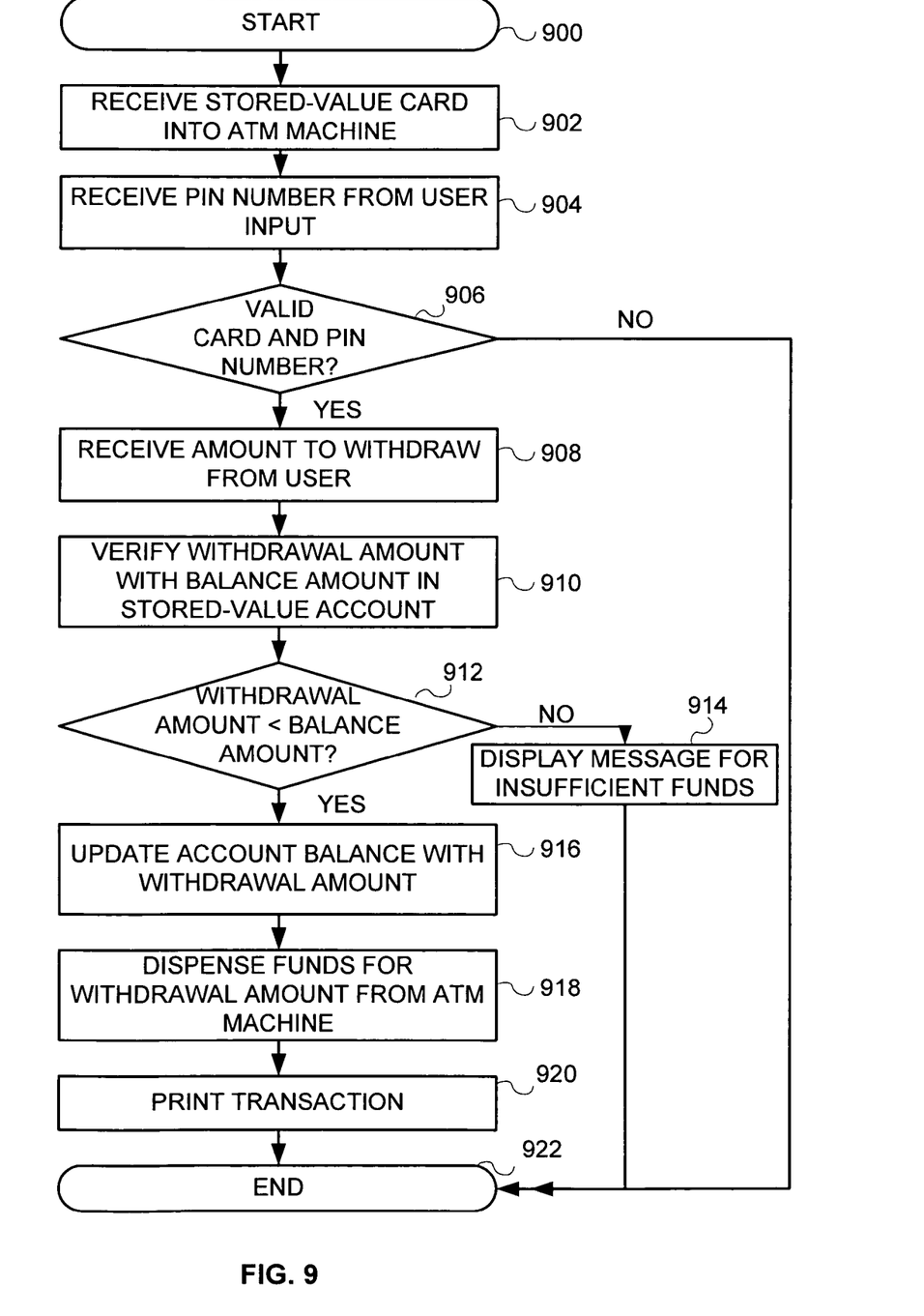
FIG. 9 is a flow chart of an ATM remote access unit for withdrawing funds from a stored-value account in an exemplary embodiment of the invention.

FIG. 9 is a flow chart of a remote access unit for withdrawing funds from a stored-value account in an exemplary embodiment of the invention. FIG. 9 begins in step 900. In step 902, the ATM machine 130 (or any remote access unit) receives the stored-value card. In step 904, the ATM machine 130 receives a PIN number based on the user input. In step 906, the ATM machine 130 checks whether the card and PIN number are valid. If invalid, the process ends in step 922. If valid, the ATM machine 130 receives an amount to withdraw from the user in step 908. In step 910, the ATM machine 130 verifies the withdrawal amount with the balance amount in the stored-value account. In step 912, the ATM machine 130 then determines whether the withdrawal amount is less than the balance amount in the stored-value account.

If the withdrawal amount is greater than the balance amount, the ATM machine 130 displays a message indicating insufficient funds in step 914 prior to ending in step 922. If the withdrawal amount is less than the balance amount, the ATM machine 130 updates the stored-value account balance with the withdrawal amount in step 916. The ATM machine 130 then dispenses funds for the withdrawal amount in step 918. The ATM machine 130 also prints out a receipt for the transaction in step 920. In some embodiments, the kiosk 110 provides statement information that is required by government regulations. The statement information from the kiosk 110 may provide improved customer service for users that are underbanked or unbanked who may not receive mail or may not have access to the Internet. FIG. 9 ends in step 922.

Slight modifications may be made in steps 910-916 to withdraw funds from a stored-value sub-account. The withdrawal process shown in FIG. 9 may also be implemented in a kiosk (e.g., the kiosk 110 in FIG. 1) instead of an ATM machine.

It is appreciated that the processes illustrated in FIGS. 5-9 may be integrated into a single process or any combinations thereof. The processes may be carried out by software which is operational when executed by a processor (e.g., the processor 450 or the card transaction processing system 140). The software may be stored in a storage medium (e.g., the storage system 460 or the card transaction processing system 140).

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processors, and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A kiosk comprising: a monetary transaction device configured to receive a deposit amount; a processor configured to enable a processing system to assign an account value calculated from the deposit amount to a stored-value account, the stored-value account being other than a demand deposit account (DDA) or a line of credit; and a card dispensing system configured to dispense a first stored-value card and a second stored-value card associated with the stored-value account, the first stored-value card and the second stored-value card configured to access the stored value account, the first stored-value card and the second stored-value card configured to access the kiosk, a different kiosk, or a remote access unit to withdraw at least a part of the account value from the stored-value account, and the first stored-value card and the second stored-value card configured to access the kiosk, the different kiosk, or the remote access unit to deposit an additional amount into the stored-value account.

2. The kiosk of claim 1 which is unattended and further configured to create the stored-value account without requiring an account holder to preregister.

3. The kiosk of claim 1 wherein the first stored-value card and the second stored-value card are enabled to operate an Automatic Teller Machine (ATM).

4. The kiosk of claim 1 wherein the first stored-value card and the second stored-value card are identical.

5. The kiosk of claim 1 wherein the kiosk is further configured to receive user identification information including at least one biometric attribute.

6. The kiosk of claim 1 wherein the stored-value account is created after an initial deposit amount has been received.

7. The kiosk of claim 1 wherein the stored-value account is a master stored-value account associated with one or more money sharing sub-accounts.

8. The kiosk of claim 1 wherein the DDA is a checking account.

9. The kiosk of claim 1 wherein the line of credit is a credit card.

* * * * *